(12) United States Patent
Schuster

(10) Patent No.: US 7,597,947 B2
(45) Date of Patent: Oct. 6, 2009

(54) VENEERED PANEL

(75) Inventor: Johannes Schuster, Salzburg (AT)

(73) Assignee: Kaindl Flooring GmbH, Wals/Salzburg (AT)

( * ) Notice: Subject to any disclaimer, the term of this patent is extended or adjusted under 35 U.S.C. 154(b) by 195 days.

(21) Appl. No.: 11/571,244

(22) PCT Filed: Oct. 14, 2004

(86) PCT No.: PCT/EP2004/052536

§ 371 (c)(1),
(2), (4) Date: Dec. 22, 2006

(87) PCT Pub. No.: WO2006/000253

PCT Pub. Date: Jan. 5, 2006

(65) Prior Publication Data

US 2007/0196676 A1     Aug. 23, 2007

(30) Foreign Application Priority Data

Jun. 25, 2004   (DE) .................. 20 2004 010 083 U

(51) Int. Cl.
*B32B 21/06*     (2006.01)

(52) U.S. Cl. .................. 428/55; 428/528; 428/529; 428/530; 428/531; 428/537.1; 428/537.5

(58) Field of Classification Search .................. 428/55, 428/537.5, 537.1, 528, 529, 530, 531
See application file for complete search history.

(56) References Cited

U.S. PATENT DOCUMENTS

| | | |
|---|---|---|
| 4,865,912 A | 9/1989 | Mitsumata |
| 5,089,348 A | 2/1992 | Louderback |
| 5,955,203 A | 9/1999 | Briggs et al. |
| 2003/0148135 A1* | 8/2003 | Ellstrom .................. 428/537.1 |

FOREIGN PATENT DOCUMENTS

DE     9653899     6/1998

* cited by examiner

*Primary Examiner*—Alexander Thomas
(74) *Attorney, Agent, or Firm*—Greenblum & Bernstein P.L.C.

(57) ABSTRACT

The invention relates to a veneered panel (1) having a supporting panel (2) and a veneer which is joined to at least one surface of the supporting panel (2). An overlay (4) is provided on the side of the veneer (3) facing away from the supporting plate.

20 Claims, 1 Drawing Sheet

VENEERED PANEL

The invention relates to a veneered panel according to the preamble of the independent claim, as well as to a method for manufacturing it.

Veneered panels are produced, in particular, for the furniture industry. The point is to provide an inexpensive supporting panel with a sophisticated surface and thus refine it. This surface consists of thin layers of natural wood with a thickness of typically 0.5 mm to 0.9 mm. The furniture, wall or flooring panels or the like manufactured from such panels thus appear to be of a higher value because the observer, due to the natural grain of the veneers, gets the impression of precious massive wood, which is mulch more expensive compared to the supporting panel. In addition, such surfaces are more pleasant to look at. For the protection of the surface, which is only formed of natural wood on the surface, against dirt, damage and dust entering the pores of the veneer, the veneered panel is provided with a varnish layer, which, incidentally, can be visually and tactually attractive.

The production of such veneered panels, as a rule, takes place at separate locations. The veneering industry slices suitable natural wood to a thickness of usually 0.5 to 0.9 mm and a width of more than 10 cm and then supplies the veneers to plants producing panels, doors or furniture, or to the retail market. The panel-producing industry, for example presses the veneers supplied onto chipboards, particle boards, HDF boards, MDF boards or multiplex boards having thicknesses of typically 5 to 50 mm. Prior to pressing the thin veneers, the individual veneer sheets must be joined with each other edge to edge. This is conventionally done by the veneers, which were laid next to each other, being joined with each other by means of adhesive-coated polyester threads laid in a zigzag pattern in order to prevent the veneers from drifting apart during pressing. In recent times, the veneers were begun to be glued together edge to edge, that is, without overlapping.

Urea glue or PVA glue, or suitable mixtures thereof, are used during pressing. The veneer pressing machines used in the panel-producing industry for pressing veneers onto panels are designed so that the pressures of 612 kg/cm$^2$ typically required can be achieved, at a temperature of 95° to 140° C. After a resting period for the glue to harden and for the veneered panel to cool off, the panel manufacturer, as a rule, carries out a so-called basic grinding which is to provide a base that is as plane as possible in view of the varnishing and grinding of the panel that takes place later. For the panel exhibits irregularities after pressing that can also be caused by the cooling out or drying out of the pressed panel, by irregularities and inhomogeneities in the supporting panel or the veneer.

These deviations usually amount to around 0.3 mm prior to the basic grinding, which is why thinner veneers, i.e. veneers with thicknesses of less than 0.5 mm, usually cannot be used in the above method. Such thicknesses would increase the risk of the veneer being completely removed in part during the basic grinding or during the later intermediate or fine grinding, so that the supporting panel would become visible and the panel unusable.

Veneered panels with basic grinding are brought onto the retail market or sold to furniture manufacturers and carpenters. They carry out a further surface treatment comprising grinding and varnishing alternately. The grinding machines used here cost approximately EUR 15,000.00 and are sufficient for processing veneers having a thickness of between 0.5 to 0.9 mm without the danger of the veneer being partially ground through.

Another method for producing veneered panels is known from countries with smaller personnel costs, wherein thinner veneers, for example having a thickness of approx. 0.3 mm are used saving cost of materials. in the process the main wood is at first steamed or cooked in a steam pit in order to ensure cuttability, suppleness and processability. Veneer webs of 0.3 mm thickness are sliced off from the wood that is wet through in this manner, and they are laid onto the preglued supporting panel sheet by sheet without them having been joined together, for example edge to edge or by means of glued polyester threads. The sheets are laid onto the supporting panel overlapping slightly while still moist from slicing, and the batch of veneers is then laboriously cleaned manually with a scraper so that, on the one hand, the irregularity is eliminated and, on the other hand, the supporting panel does not shine through. This is a particularly work-intensive process that cannot be done by machines, it is only then that the base panel on which the veneer is laid is inserted into a conventional veneering press that presses with approx. 6-12 kg/cm$^2$. Thus a very large personnel expenditure is to be seen alongside a yield in the veneer production that is 80% higher. However, the later processing of panels thus produced is problematic. In particular in Europe, because of the greater quality requirements. A normal joiner with his grinding machines worth about EUR 15,000.00 is not capable of accomplishing the grinding and varnishing process because the grinding device at his disposal cannot take into account the irregularities, thus partially grinding the veneer through to the base, or because he does not conform to the quality requirements existing in Europe with this product.

Thus, the problem is that the veneer-producing industry supplies plants producing panels, doors and furniture, or the retail market, which themselves have different technical possibilities of processing. Thus, the currently common veneer thickness of 0.5 to 0.6 mm represents a compromise that the processing businesses are able to work well with almost all over the world, except for the US or Switzerland, which usually require material thicknesses of 0.65 mm or 0.9 mm.

In addition, so-called "veneer laminates" are known, wherein one or more layers of paper are laminated with a veneer and an overlay. In this manner, a flexible and easily processable veneer laminate can be obtained which can be glued onto panels. The overlay is a paper-like surface having good transparency, which is impregnated with melamine resin or melamine-phenolic resin and which is joined with the veneer by means of melamine resin or melamine-phenolic resin. However, the presence of paper may also interfere with the appearance.

It is therefore the object of the invention to specify an improved veneer panel.

This object is solved by a veneered panel having the features of the main claim. Advantageous embodiments are the subject matter of the dependent claims.

It is provided, according to the invention, that the veneer of a veneered panel is provided with an overlay. An overlay within the sense of the invention is understood to be a prepared flat layer laid out onto the veneer, the layer then establishing a connection with the veneer in order to protect it from environmental influences and ensure fitness for use. The simplest conceivable overlay is a web of a single material, e.g. a web of resin without paper. In particular, the overlay gives protection against damage or partial removal of the veneer, soiling and dust entering the veneer. Therefore, an overlay within the sense of the invention should be understood to be a delimitation against the varnish layer according to the prior art, which is applied, e.g., by varnishing, brushing or spraying.

It must therefore be considered an advantage of the panel veneered according to the invention, which has an overlay, that no varnishing machine must be used prior to the surface treatment. There are no suitable varnishing machines on the market, especially for panels having greater widths, e.g. from 1.3 m. Furthermore, the labor-intensive and ecologically harmful process steps basic grinding, base varnish, intermediate grinding, cover varnish, which are common in veneer panel processing can be dispensed with at the processer. Varnishing chambers and varnishing lines that entail large investments for any business, as well as running costs, in particular due to disposal issues, are superfluous. Furthermore, overlay is equal to or better than varnish with regard to surface sensitivity, as test concerning resistance to scratches, heat and moisture have shown. Moreover, the panel veneered according to the invention, having an overlay Instead of varnish is the substantially cheaper variation. For example, the estimated cost per m panel veneered on both sides in the case of overlay pressing (material+pressing process) Is approx. EUR 2.00, whereas a surface varnished on both sides with all steps, depending on technical configuration, entails costs of between EUR 6.00 and EUR 9.00/m². In addition, due to the overlay, thicker layers can be applied in one process step than in varnishing. In contrast to the varnishing process, the application of several layers of varnish is replaced according to the invention. The carpenter or manufacturer of furniture only has to cut the veneer panels according to the invention to size, and does not have to do any work on surface finishing.

The veneered panel configured according to the invention makes saving on working hours and costs possible, independent from the thickness of the veneer. Furthermore, it has the advantage that small veneer thicknesses of less than 0.5 or 0.4 or even 0.3 mm can be used, which, in the prior art, cannot be used, or can only be used with considerable effort.

If the overlay, as in one embodiment, contains adhesive, in particular resin, such as, e.g. melamine resin or melamine-phenolic resin, then particularly established, well-known and well-processable glues can be used that are known, for example, from the manufacture of laminate floorings. Thus, the development of suitable adhesives can be dispensed with, and an existing comprehensive documentation can be referred to. In addition, the long term behavior of this material is known. This reduces the research and development costs. Melamine-phenolic resin is particularly flexible.

If the overlay directly borders on the veneer, that is, if there are no substances enclosed between the overlay and the veneer except for the adhesive, then the processability is simplified and the costs are reduced. For example, it is known from laminate floorings to insert abrasion-resistant substances between the decorative paper and the overlay. Because the surfaces of the panels used in the furniture industry or in wall panels are subjected to significantly less stress, it is sufficient in this case if the overlay directly borders on the veneer.

If the veneer directly borders on the supporting panel, that is, if there are no other intermediate layers between the veneer and the supporting panel apart from the usually employed adhesive, primarily glue, then a simple, direct and thus cost-saving and process step-saving connection is established. In contrast, the so-called "veneer laminate" known from the art has one or more paper layers as carrier underneath the veneer. In comparison, the veneered panel according to the invention is configured more simply and requires less intermediate steps for establishing a connection between the veneer and the supporting panel.

It is provided in another embodiment that the overlay is joined with the veneer by pressing. Pressing offers various advantages. It is less harmful environmentally than varnishing since no environmentally relevant volatile substances are released during pressing. The basic grinding that requires high precision and investments is not required of the processer, for example the carpenter or the like, since he, as a rule, will not be able to invest in the very expensive machines.

Thus, it is also possible to use less expensive thinner veneers having a thickness of less than the usual 0.5 mm. By an appropriate selection of the pressing surfaces, the overlay may receive glossy, matte or structured surfaces, e.g. a structured surface similar to the surface of natural wood having similar tactual properties. Thus, no alternating repeated grinding and varnishing is necessary to achieve a smooth surface. Pressing can, for example, take place in short cycle presses or calender presses. Veneer presses are not suitable because they are not capable of exerting the required pressure of about 20-30 kg/cm².

It is provided in another advantageous embodiment that the overlay comprises an overlay paper. It has the advantage that it serves as a carrier for the adhesive layer. In this way, the overlay can be produced, transported and finally introduced into the press separately in a safer and simpler manner.

Impregnating the overlay with adhesives facilitates the connection of the overlay with the veneer under pressure and high temperatures, because ample adhesive is present similar to a buffer. Pressing con be done more safely. Transparency is achieved by applying pressure and temperature.

Moreover, it is preferred that the overlay paper consists of at least 80%, preferably more than 99%, and particularly preferably 100% cellulose. The use of cellulose has the advantage that almost complete transparency is achieved. Softwood or eucalyptus pulp is preferred because it is inexpensive and readily available.

Experiments have shown that the basis weight (grammage) of the overlay paper of between 25 and 80 g/m² can be used particularly well with regard to the penetration rate, suction head and porosity. If one stays below or above this range, then tears in the surface and a milky surface, respectively, are the result.

The technical properties of the overlay paper stated in the claims regarding penetration rote, suction head and porosity, facilitate impregnation of the overlay, i.e. the connection of the adhesive. In particular the melamine resin, with the overlay paper for creating an overlay, and further facilitates the connection of an overlay thus produced with the veneer, in particular by pressing. The parameters stated according to the claims enable, in particular when combined, an excellent sheet appearance, low basis weight, high volume, high dimensional stability, high porosity and a high suction head. Thus, it is ensured during the impregnation of the overlay paper that a lot of resin is absorbed in a short time, with a very good resin distribution being effected in x-, y- and z-direction. In particular, the washboard effect, i.e. a wavy surface appearance, is avoided. In addition, the aforementioned parameters have the effect that a very good transparency permitting a free view onto the veneer is achieved after the pressing. So called milky ways, i.e. areas of dull transparency, are avoided and a uniform abrasion is the result. Such an overlay can be joined without any problems with non-impregnated veneers, that is, veneers that have no adhesive layer of their own (melamine and the like). Finally, such overlays are printable. Such an overlay paper suitable for the production of an panel according to the invention is available from the company Schoeller and Hoesch under the name TVO overlay paper.

Additional advantages follow from the following description and the attached drawing. The aforementioned features, which will be explained further, can be also used individually or in combination, according to the invention. The embodiments mentioned shall not be understood to be final, they have the character of examples.

DETAILED DESCRIPTION OF THE DRAWING

Figure 1:
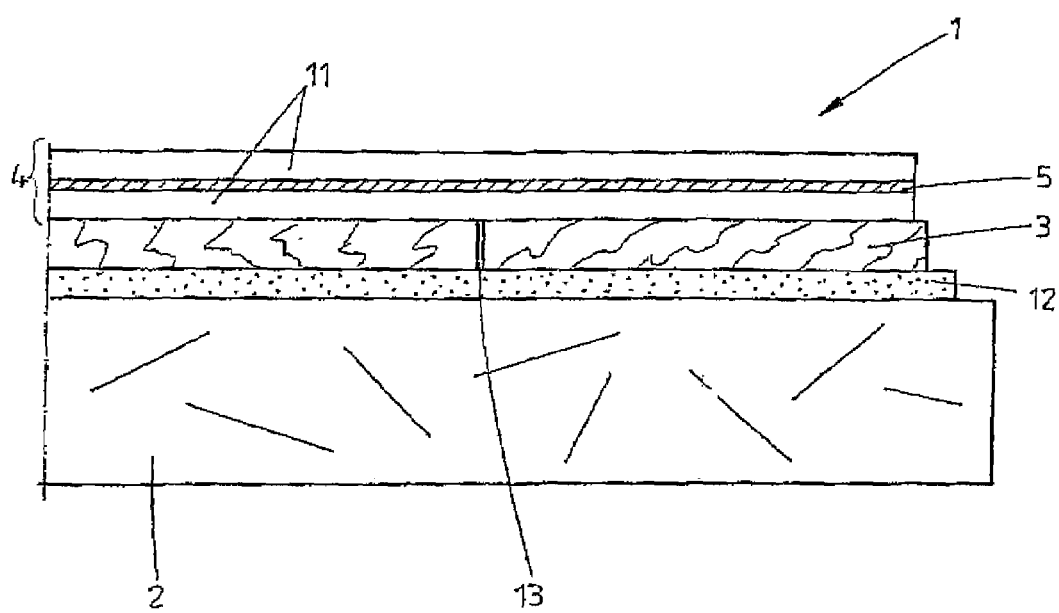
FIG. 1 shows a veneered panel according to the invention.

FIG. 1 shows a veneered panel 1 configured according to the invention, wherein the natural wood veneer 3, which consists of several individual veneers joined edge to edge 13, is attached to a supporting panel 2 and protected against environmental influences by a protective layer consisting of an overlay 4 lying on top of it. In the process, the veneer 3 was pressed with the supporting panel 2 by means of a conventional veneer press and a glue 12.

In another process step, the overlay 4 consisting of an overlay paper 5, e.g. TVO, impregnated with resin 11, was pressed with the veneer 5. In experiments with the Sieplekamp press, the following values were determined as an example: pressing temperature 174° C., pressing pressure 22 kg/cm$^2$, pressing time 24 sec, paper weight of the overlay paper 25 g/m$^2$ and sheet metal: satin.

In the process, TVO overlay papers were used having a basis weight (grammage) of 25 g/m$^2$, impregnated with melamine resin having a resin proportion of 62 g/m$^2$, so that the impregnated paper has a total weight of 87 g/m$^2$. In the case of 40 g TVO overlay paper, a resin proportion of 85 g/m$^2$ and a total weight of 125 g/m$^2$ was the result.

The invention claimed:

1. A veneered panel with a supporting panel and a veneer joined with at least one surface of the supporting panel, the veneered panel comprising:
    a prepared flat layer overlay being provided on a side of the veneer facing away from the supporting panel and being joined to the veneer via pressing;
    the overlay comprising an overlay paper impregnated with adhesive; and
    the veneer comprising several sheets joined edge to edge and held together by gluing the edges prior to joining the veneer with the at least one surface of the supporting panel,
    wherein the veneer has a thickness of less than 0.5 mm.

2. The panel according to claim 1, wherein the overlay comprises a layer of adhesive joined with the veneer.

3. The panel according to claim 2, wherein the layer of adhesive is resin.

4. The panel according to claim 3, wherein the resin is melamine or melamine phenol.

5. The panel according to claim 1, wherein the overlay borders directly on the veneer.

6. The panel according to claim 1, wherein the veneer borders directly on the supporting panel.

7. The panel according to claim 1, wherein the veneer has a thickness of less than 0.4 mm.

8. The panel according to claim 7, wherein the thickness is less than 0.3 mm.

9. The panel according to claim 1 wherein the overlay paper comprises at least 80% cellulose.

10. The panel according to claim 9, wherein the overlay paper comprises more than 99% cellulose.

11. The panel according to claim 9, wherein the cellulose is softwood and/or eucalyptus pulp.

12. The panel according to claim 1, wherein the overlay paper has a basis weight of 25 to 80 g/m$^2$.

13. The panel according to claim 1, wherein the overlay paper has a penetration rate of less than 4 sec, a suction head according to Klemm of at least 100 lgs and a porosity of more than 100 l/m$^2$s.

14. The panel according to claim 13, wherein the overlay paper has a suction head according to Klemm of 150 mm lgs and a porosity of 300 l/m$^2$s.

15. The panel according to claim 1, wherein the thickness is 0.25-0.4 mm.

16. The panel according to claim 1, wherein the impregnated adhesive is resin.

17. The panel according to claim 16, wherein the resin is melamine or melamine phenol.

18. The panel according to claim 1, wherein the veneer and overlay form a separate assembly that is joined to the at least one side of supporting panel only after the overlay is adhesively joined to the veneer.

19. A veneered panel comprising:
    a supporting panel;
    a separately formed assembly comprising two adhesively connected layers;
    one of the layers being a prepared flat layer overlay utilizing an overlay paper impregnated with adhesive; and
    another of the layers being a non-impregnated veneer comprising several sheets joined edge to edge and held together by gluing the edges,
    wherein the assembly is joined to the supporting panel by adhesively attaching a veneer side of the assembly to a surface of the supporting panel,
    wherein the non-impregnated veneer has a thickness of less than 0.5 mm.

20. The panel of claim 19, wherein the overlay paper has a basis weight of between 25 and 80 g/m$^2$.

* * * * *